(12) United States Patent
Na et al.

(10) Patent No.: US 8,528,081 B2
(45) Date of Patent: Sep. 3, 2013

(54) MEMORY SYSTEM

(75) Inventors: Jimyung Na, Suwon-si (KR); Gijin Kang, Seoul (KR); Jung-Hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 795 days.

(21) Appl. No.: 12/632,384

(22) Filed: Dec. 7, 2009

(65) Prior Publication Data

US 2010/0174888 A1    Jul. 8, 2010

(30) Foreign Application Priority Data

Jan. 5, 2009  (KR) .................. 10-2009-0000393

(51) Int. Cl.
*G06F 21/00*    (2006.01)

(52) U.S. Cl.
USPC ............. 726/22; 713/190; 707/687; 707/697; 707/698; 707/699; 711/216

(58) Field of Classification Search
USPC .......................................... 726/22
See application file for complete search history.

(56) References Cited

U.S. PATENT DOCUMENTS

| | | | |
|---|---|---|---|
| 6,233,339 B1 | 5/2001 | Kawano et al. | |
| 6,331,946 B1 | 12/2001 | Silverbrook et al. | |
| 7,149,901 B2 * | 12/2006 | Herbert et al. | 713/190 |
| 7,500,098 B2 * | 3/2009 | Paatero | 713/165 |
| 2002/0166058 A1 | 11/2002 | Fueki | |
| 2004/0059967 A1 * | 3/2004 | Kleppel et al. | 714/52 |
| 2004/0143739 A1 * | 7/2004 | de Jong | 713/176 |
| 2006/0219796 A1 | 10/2006 | Na | |
| 2006/0288223 A1 * | 12/2006 | Kiehtreiber et al. | 713/176 |
| 2007/0168793 A1 | 7/2007 | Seo | |
| 2007/0286413 A1 | 12/2007 | Derouet | |
| 2008/0046737 A1 * | 2/2008 | Mihm et al. | 713/176 |
| 2008/0120492 A1 * | 5/2008 | Dye | 712/225 |

FOREIGN PATENT DOCUMENTS

| | | |
|---|---|---|
| JP | 2000-115183 | 4/2000 |
| JP | 2002-328845 | 11/2002 |
| JP | 2006-040013 | 2/2006 |
| JP | 2007-011591 | 1/2007 |
| JP | 2007-183937 | 7/2007 |
| JP | 2007-328789 | 12/2007 |
| KR | 1020020085753 | 11/2002 |
| KR | 1020060067584 | 6/2006 |
| KR | 1020070074308 | 7/2007 |
| KR | 10-0837270 | 12/2007 |

OTHER PUBLICATIONS

Chen et al., "Oblivious Hashing: A Stealthy Software integrity Verification Primitive", 2003, pp. 400-414.*
English Abstract for Publication No. 2000-115183.
English Abstract for Publication No. 2002-328845.

(Continued)

*Primary Examiner* — Taghi Arani
*Assistant Examiner* — Thaddeus Plecha
(74) *Attorney, Agent, or Firm* — F. Chau & Associates, LLC

(57) ABSTRACT

A memory system includes a storage device storing a plurality of instructions and a central processing unit processing an instruction fetched from the storage device, wherein the central processing unit detects a change in the instruction fetched from the storage device while processing the instruction.

4 Claims, 13 Drawing Sheets

(56) References Cited

OTHER PUBLICATIONS

English Abstract for Publication No. 1020020085753.
English Abstract for Publication No. 2006-040013.
English Abstract for Publication No. 1020060067584.
English Abstract for Publication No. 2007-011591.
English Abstract for Publication No. 1020070074308.
English Abstract for Publication No. 2007-183937.
English Abstract for Publication No. 1020070117172 (for 10-0837270).
English Abstract for Publication No. 2007-328789.

* cited by examiner

Fig. 4

```
#-------------------------------------------------------------#
#         PROGRAM Sequence Compare PD inserted                #
#-------------------------------------------------------------#

Instruction1 :
      Compare PD :                              #1
      EDC Value(Instruction1) :
      Instruction2 :
      Instruction3 :
      Jump A :
      Instruction4 :
      Instruction5 :
      Compare PD :                              #2
      EDC Value(Instruction5) :
A :   Instruction6 :
      Instruction7 :  <- Interrupt generated at this point
      Compare PD :                              #3
      EDC Value(Instruction7) :
      Instruction8 :
      Instruction9 :
      Branch B :
      Instruction10 :
      Instruction11 :
B :   Instruction12 :
      Instruction13 :
      Compare PD :                              #4
      EDC Value(Instruction13) :
      Instruction14 :
      Instruction15 :
      Instruction16 :
      . . . . . . . . . . . . .
      . . . . . . . . . . . . .
      . . . . . . . . . . . . .
C :   Instruction_interrupt1 :  #interrupt service routine
      Instruction_interrupt2 :
      Compare PD :                              #5
      Instruction_interrupt3 :
      Instruction_interrupt4 :
      return :         # end of interrupt service routine
D :   Instruction30 :
      Instruction31 :
      Compare PD :                              #6
      EDC Value(Instruction31) :
      Instruction32 :
      Instruction33 :
      . . . . . . . . . . . . .
      . . . . . . . . . . . . .
```

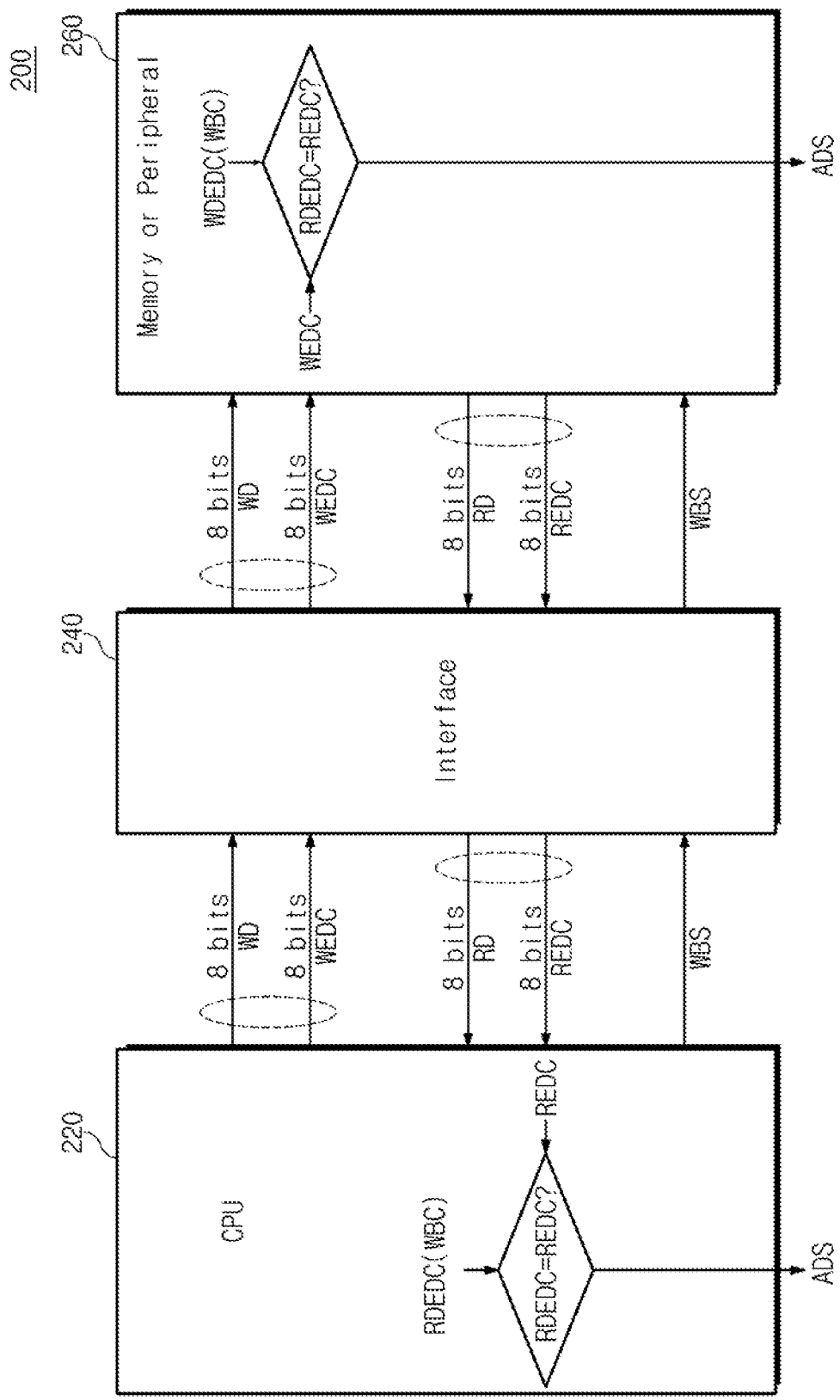

EDC Data = f(Real instruction)

| N-M bits | | | | | | | | | M bits | | | | | | | |
|---|---|---|---|---|---|---|---|---|---|---|---|---|---|---|---|---|
| 0 | 0 | 0 | 0 | 0 | 0 | 0 | 0 | | 0 | 0 | 0 | 0 | 1 | 1 | 0 | 1 |
| 0 | 0 | 0 | 0 | 0 | 0 | 0 | 0 | | 0 | 0 | 1 | 1 | 0 | 1 | 0 | 1 |
| 0 | 0 | 0 | 0 | 0 | 0 | 0 | 0 | | 0 | 1 | 0 | 1 | 0 | 1 | 1 | 1 |
| 0 | 0 | 0 | 0 | 0 | 0 | 0 | 0 | ... | 0 | 1 | 1 | 1 | 0 | 1 | 1 | 0 |
| 0 | 0 | 0 | 0 | 0 | 0 | 0 | 0 | | 1 | 0 | 0 | 0 | 1 | 0 | 1 | 0 |
| 0 | 0 | 0 | 0 | 0 | 0 | 0 | 0 | | 1 | 0 | 1 | 1 | 0 | 1 | 1 | 0 |
| : | | | | | | | | | : | | | | | | | |
| 1 | 1 | 1 | 1 | 1 | 1 | 1 | 1 | | 1 | 1 | 0 | 0 | 0 | 0 | 0 | 1 |
| 1 | 1 | 1 | 1 | 1 | 1 | 1 | 1 | | 1 | 1 | 1 | 1 | 0 | 0 | 0 | 1 |

Real Instruction             EDC Value

MEMORY SYSTEM

CROSS-REFERENCE TO RELATED APPLICATION

This U.S. non-provisional patent application claims priority under 35 U.S.C §119 to Korean Patent Application No. 10-2009-0000393, filed on Jan. 5, 2009, the disclosure of which is hereby incorporated by reference.

BACKGROUND

1. Technical Field

The present invention relates to memory systems, and more particularly to methods and systems for secure memory operations.

2. Description of Related Art

Smart cards have integrated circuit (IC) chips including embedded microprocessors, card operating systems, security modules, memories, etc. for specific processing tasks. Smart cards carry out various functions such as operations, encryption, and bilateral communication, offering high security and portability for users. Smart cards are widely used in applications for identification, authentication, data storage, and so on.

Smart cards, terminals, and application software are organically combined with one another. In this regard, the smart card industry is being widely used in financial services, transportation cards, medical cards as well as mobile phone services. It is expected that usage of smart cards will be expand with the advance of the Internet and electronic commerce given the mobility and security function of smart cards, which make smart cars particularly suitable for electronic commerce and online services.

Security is an important feature of smart cards. Therefore, security technology for smart cards is significant to development. Security functions may be implemented for a chip operating system, network, application, etc. Security principles for smart cards include privacy, non-repudiation, authentication, integrity, and verification.

Further, anti-hacking features are important. Known physical anti-hacking technologies utilize a light detector, an inner insulation removal detector, and an active shield removal detector. These technologies operate to indicate the removal of a physical shield of a chip, making the chip inoperable.

However, these technologies are susceptible to hacking given sufficient time and/or technology. Therefore, a need exists for improved security features.

SUMMARY

According to an embodiment of the present invention, a memory system includes a storage device storing a plurality of instructions, and a central processing unit processing an instruction fetched from the storage device. The central processing unit detects a change in the instruction fetched from the storage device while processing the instruction.

According to an embodiment of the present invention, a memory system includes a memory storing read data and a first error detector code value of the read data, an interface for simultaneously transmitting the read data and the first error detector code value of the read data, and a central processing unit calculating a second error detector code value of the read data transmitted from the memory and comparing the second error detector code value with the first error detector code value transmitted from the memory to determine whether the read data is changed, wherein the interface is configured to perform an interface operation between the central processing unit and the memory.

According to an embodiment of the present invention, a memory system may include a central processing unit calculating a first error detector code value of write data during a write operation and simultaneously transmitting the write data and the calculated first error detector code value, a memory storing a second error detector code value of the write data transmitted from the central processing unit, comparing the first error detector code value transmitted from the central processing unit with the second error detector code value to determine whether the write data is changed, and storing the write data transmitted from the central processing unit, and an interface performing an interface operation between the central processing unit and the memory.

BRIEF DESCRIPTION OF THE DRAWINGS

FIG. 4 illustrates program the steps of inserting a compare PD instruction.

FIG. 5 illustrates a memory system according to other embodiments of the present invention.

DETAILED DESCRIPTION OF EXEMPLARY EMBODIMENTS

Exemplary embodiments of the present invention will now be described more fully hereinafter with reference to the accompanying drawings.

A memory system according to an embodiment of the present invention may detect instruction and data change arising from security attacks to provide more improved security function than a conventional memory system. A memory system according to an embodiment of the present invention detects whether a fetched instruction is changed while processing an instruction and determines whether to perform a reset operation, based on a detecting result. Thus, a memory system may be made secure from laser based attacks (e.g., using small-wavelength high-energy light to read a pattern of a smart chip), glitch type attacks (e.g., violating security measures by disrupting the execution of one or more machine instructions), etc.

Some embodiments of the present invention provide a program data comparing method. When program data is changed or a power glitch arises from laser attack or glitch attack, the changed program data is detected by means of the program data comparing method. The program data is an instruction value.

Figure 1:
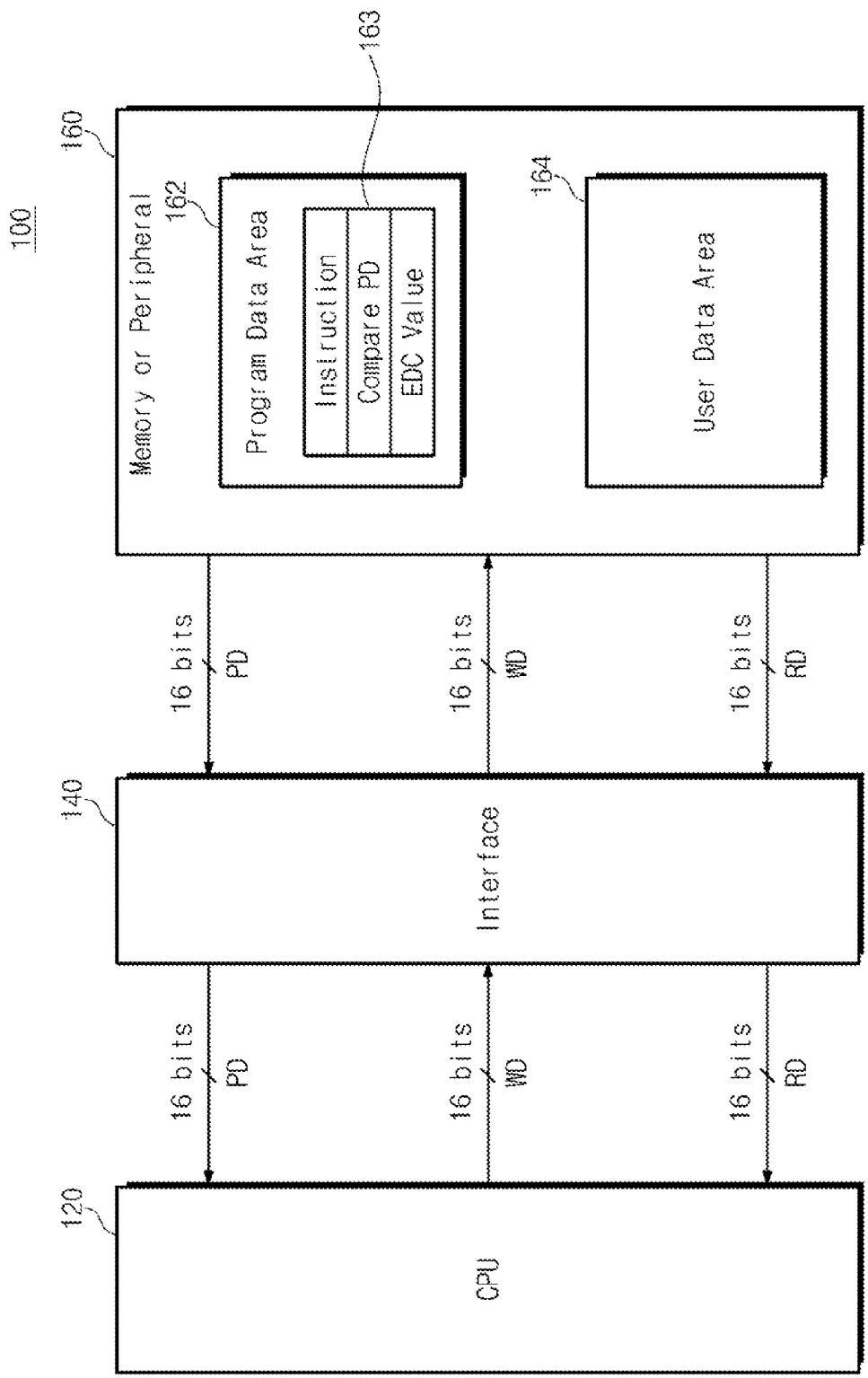
FIG. 1 illustrates a memory system according to some embodiments of the present invention.

FIG. 1 illustrates a memory system 100 according to some embodiments of the present invention. The memory system 100 includes a central processing unit (CPU) 120, an interface 140 and a memory/peripheral circuit 160. The memory system 100 is embodied to have a compare instruction, which is used to compare a value of an instruction with a value of the instruction's error detector code (EDC) to determined whether an instruction has been changed from a complied state. That is, the memory system 100 determines whether an instruction from program data has been changed since the program data including the instruction was complied and stored to the smart chip.

The CPU 120 controls operations of the memory system 100. The CPU 120 is configured to process a compare instruction. The CPU 120 compares a value of an instruction with the instruction's EDC value. This compare operation is a procedure of verifying whether an EDC value is an EDC value of an instruction.

For example, when an EDC value is defined as an inverted value of the instruction, the CPU 120 compares the inverted value of the instruction with an EDC value. If the inverted value of the instruction is equal to the EDC value, it is determined that a hacking attempt is not made on the instruction. On the other hand, if the inverted value of the instruction is not equal to the EDC value, it is determined that a hacking attempt is made on the instruction. When the hacking attempt is detected, the CPU 120 may perform a defensive measure, such as resetting or powering off all circuits of the memory system 100.

The interface 140 interfaces the CPU 120 and the memory/peripheral circuit 160. The interface 140 transmits program data PD to the CPU 120 through a 16-bit bus during an instruction fetch operation. The program data PD is an instruction fetched from a program data area 162 of the memory/peripheral circuit 160. The interface 140 receives write data WD from the CPU 120 through the 16-bit bus during a write operation of a user data area 164 and transmits read data RD to the CPU 120 through the 16-bit bus during a read operation of the user data area 164.

The memory/peripheral circuit 160 is an area to store data and includes the program data area 162 and the user data area 164. The program data area 162 is an area to store instructions for driving the memory system 100. The memory/peripheral circuit 160 transmits the program data PD to the interface 140 through the 16-bit bus during an instruction fetch operation. The memory/peripheral circuit 160 receives the write data WD through the 16-bit bus during a write operation of the user data area 164 and transmits the read data RD to the interface 140 through the 16-bit bus during a read operation of the user data area 164.

The memory/peripheral circuit 160 includes the program data area 162 and the user data area 164 to store data generated while driving the CPU 120. The memory/peripheral circuit 160 according to an embodiment of the present invention is a memory device or a circuit that may store data. The memory device may be a volatile memory device (e.g., DRAM, SRAM, etc.) or a nonvolatile memory device (e.g., NAND flash memory, NOR flash memory, PRAM, FRAM, MRAM, etc.).

The program data area 162 includes a security instruction set 163 having an instruction, an EDC value of the instruction, and a compare PD instruction. The security instruction set 163 is automatically produced when programmed instructions are compiled. That is, a compare PD instruction is automatically inserted during a compile operation. A user cannot use such a compare PD instruction.

Selection of a compile option during system production allows for the regulation of the automatic insertion of the compare PD instruction. For example, for applications that require enhanced security, a compile option may be selected such that the compare PD instruction is inserted with respect to all instructions. On the other hand, security is a lesser requirement, a compile option may be selected such that the compare PD instruction is inserted with respect to only low-frequency instructions.

During the code compile operation, an EDC value of an instruction previous to a compare PD instruction is automatically inserted following insertion of the compare PD instruction. An inverted value of an instruction may be used as the error detector code value. As mentioned herein, a security instruction set is formed during the code compile operation. The security instruction set includes an instruction, a compare PD instruction, and an EDC code value, e.g., an inverted value of the instruction.

During the code compile operation, selections of a location of the compare PD instruction and a percentage of the compare PD instruction to be inserted are made. Accordingly, a compiler automatically inserts the compare PD instruction during the code compile operation. The compiler determines the total code size to uniformly insert the compare PD instruction.

Figure 2:
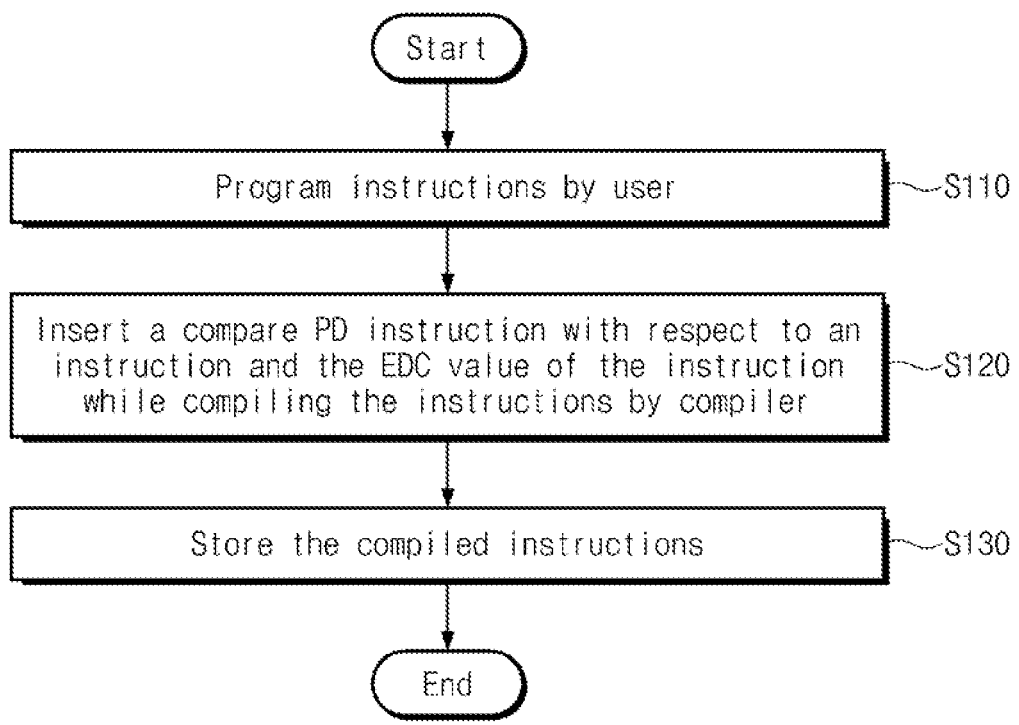
FIG. 2 is a flowchart illustrating a method of storing instructions by the memory system according to the present invention.

FIG. 2 is a flowchart illustrating a method of storing instructions by the memory system according to an embodiment of the present invention. An instruction storing method will be described, as set forth below with reference to FIGS. 1 and 2.

A user programs instructions to be driven at the memory system 100 (S110). Hereinafter, programmed instructions will be referred to as "instruction program." A compiler automatically inserts a compare PD instruction corresponding to an instruction and an EDC value of the instruction while compiling the instruction program (S120). Thus, when compiling the instruction program is completed, the compiled instructions are stored in the program data area 162 of the memory/peripheral circuit 160. In the program data area 162 according to an embodiment of the present invention, there are a plurality of security instruction sets which are capable of sensing data change of an instruction.

Figure 3:
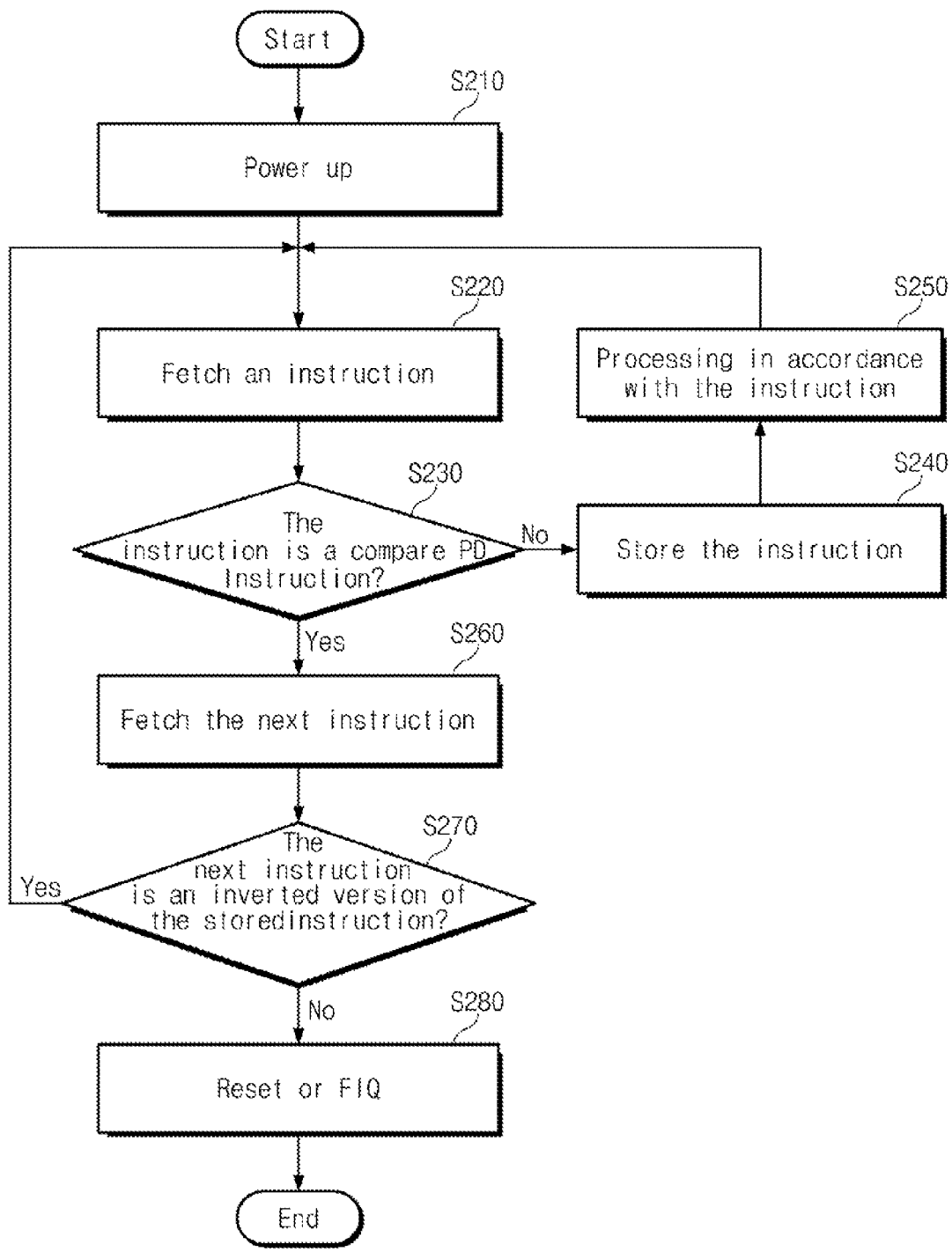
FIG. 3 is a flowchart illustrating a method of processing an instruction by the memory system according to the present invention.

FIG. 3 is a flowchart illustrating a method of processing an instruction by the memory system according to an embodiment of the present invention. An instruction processing method will now be described, as set forth below with reference to FIGS. 1 and 3.

On power-up, the central processing unit (CPU) 120 transmits a start address for fetching instructions to the memory/peripheral circuit 160 (S210). The memory/peripheral circuit 160 reads an instruction corresponding to the start address. The read instruction is transmitted to the CPU 120 via the interface 140. Thus, an instruction fetch operation is started (S220). The CPU 120 decodes a fetched instruction and determines whether the decoded instruction is a compare PD instruction (S230).

If the currently fetched instruction is not the compare PD instruction, it is stored in a register (S240). The CPU 120 performs a function according to the fetched instruction (S250). The flow proceeds to fetch the next instruction (S230).

If the currently fetched instruction, which is stored in a register of the CPI, is a compare PD instruction, the CPU 120 fetches the next instruction from the program data area 162 (S260). The fetched next instruction is an error detector code (EDC) value of the instruction stored in the register.

The CPU 120 determines whether a value of the fetched instruction is equal to an inverted value of the stored instruction (S270). If the value of the next instruction is equal to the inverted value of the stored instruction, it is determined that data on the instruction is not changed. The flow proceeds to fetch the next instruction (S220).

If the value of the fetched instruction is not equal to the inverted value of the stored instruction, it is determined that data on the instruction is changed. The memory system 100 performs a reset operation or a fast interrupt request (FIQ) according to an anti-hacking routine (S280).

FIG. 4 illustrates an exemplary program for inserting a compare PD instruction. Referring to FIG. 4, the compare PD instruction is inserted following a first instruction Instruction1, a fifth instruction Instruction5, a seventh instruction Instruction7, a thirteenth instruction Instruction13, a second interrupt instruction Instruction_interrupt2, and a thirty-first instruction Instruction31. An EDC value of the respective instructions is inserted following the inserted compare PD instruction.

The memory system 100 according to an embodiment of the present invention is configured to perform a normal operation except in the case of malfunction resulting from a hacking attack during insertion of a compare PD instruction. A central processing unit (CPU) 120 is designed with hardware to execute a compare PD instruction. A compiler is programmed to insert a compare PD instruction and to insert an error detector code (EDC) value of an instruction after insertion of the compare PD instruction.

The memory system 100 illustrated in FIG. 1 is designed based on a 16-bit data bus. However, embodiments of the present invention are not limited thereto. That is, the memory system 100 may be designed based on a 32-bit or higher bit data bus.

The memory system 100 according to an embodiment of the present invention includes a compare PD instruction to detect whether data of an instruction is changed. Namely, the compare PD instruction is processed to determine whether data of the instruction is changed.

According to an embodiment of the present invention, a protection method is implemented. When change of a data value or a power glitch arises from a laser attack or a glitch attack, the laser attack or the glitch attack may be detected by means of the protection method.

FIG. 5 illustrates a memory system according to other embodiments of the present invention. Referring to FIG. 5, a memory system 200 includes a central processing unit (CPU) 220, an interface 240, and a memory/peripheral circuit 260. The memory system 200 is embodied to transmit error detector code data WEDC and REDC using an unused bus during a half word access operation or a byte access operation. The CPU 220 and the memory/peripheral circuit 260 are configured to calculate an EDC value of access data according to an EDC algorithm during the half word access operation or the byte access operation.

The memory system 200 includes a 16-bit data bus. The memory system 200 performs a 16-bit access, e.g., word access operation. In certain cases, the memory system 200 may perform a half word access operation or a byte access operation. The memory system 200 transmits EDC data using an unused 8-bit bus during a half word access operation or a byte access operation.

A method of preventing hacking during a byte read operation will now be described in detail. During the byte read operation, read data RD is transmitted from the memory/peripheral circuit 260 through a 8-bit bus while an EDC value of the read data RD (hereinafter referred to as "REDC") is transmitted through an unused 8-bit bus. The value REDC is an EDC value of the read data RD transmitted from the memory/peripheral circuit 260.

The CPU 220 calculates an EDC value of the read data RD transmitted from the memory/peripheral circuit 260 in response to a word/byte signal WBS. The word/byte signal WBS specifies whether the operation is a word access operation or a byte access operation. The CPU 220 determines whether the calculated EDC value (hereinafter referred to as "RDEDC") is equal to the transmitted EDC value REDC to generate an attack detection signal ADS.

If the calculated EDC value RDEDC is equal to the transmitted EDC value REDC, it is determined that there is no hacking attack on the data. If the calculated EDC value RDEDC is not equal to the transmitted EDC value REDC, it is determined that there is a hacking attack on the data. When it is determined that there is a hacking attack, the memory system 200 is reset or enters a specific mode such that the hacking does not proceed.

A method of preventing hacking during a byte write operation will now be described in detail. During the byte write operation, the CPU 220 transmits write data WD through a 8-bit bus while an EDC value of the write data WD (hereinafter referred to as "WEDC") is transmitted through an unused 8-bit bus. The value WEDC is an EDC value of the write data WD transmitted from the CPU 220.

The memory/peripheral circuit 260 calculates an EDC value of the write data WD in response to the word/byte signal WBS. The memory/peripheral circuit 260 determines whether the calculated EDC value WDEDC is equal to the transmitted EDC value WEDC to generate an attack detection signal ADS.

If the calculated EDC value WDEDC is equal to the transmitted EDC value WEDC, it is determined that there is no hacking attack on the data. If the calculated EDC value WDEDC is not equal to the transmitted EDC value WEDC, it is determined that there is a hacking attack on the data. When it is determined that there is a hacking attack, the memory system 200 is reset or enters a specific mode such that the hacking does not proceed.

Figure 6:
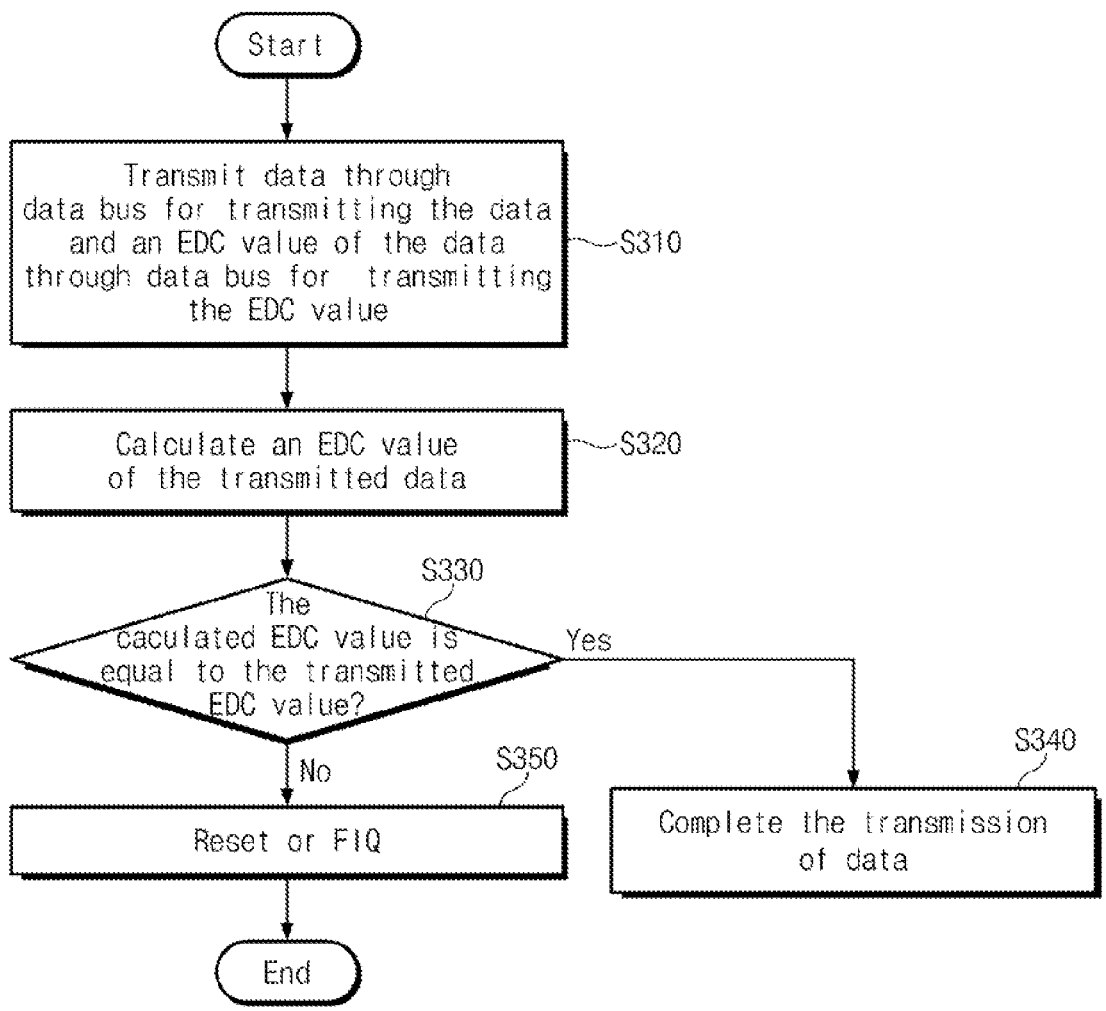
FIG. 6 is a flowchart illustrating a method of transmitting data of the memory system according to the present invention.

FIG. 6 is a flowchart illustrating a method of transmitting data of the memory system according to an embodiment of the present invention. Referring to FIGS. 5 and 6, a data transmission method will now described below in detail.

A transmitter, the CPU 220 or the memory/peripheral circuit 260, transmits data to a bus used during byte access and transmits an EDC value of data to be transmitted to an unused bus to a receiver, the memory/peripheral circuit 260 or the CPU 220 (S310). The transmitter calculates an EDC value relative to data during the byte access. The receiver calculates the EDC value from the transmitted data (S320).

The receiver determines whether the calculated EDC value is equal to the transmitted EDC value (S330). If the calculated EDC value is equal to the transmitted EDC value, the receiver determines that there is no hacking attempt on the data and the data transmission is completed (S340). On the other hand, if the calculated EDC value is not equal to the transmitted EDC value, the receiver determines that there is a hacking attempt on the data. At this point, the memory system 200 is reset or enters a specific mode (S350).

The memory system 200 illustrated in FIG. 5 is designed based on a 16-bit data bus. However, embodiments of the present invention are not limited thereto. That is, the memory system 200 may be designed based on a 32-bit or higher bit data bus.

According to an embodiment of the present invention, the number of processing bits may be selective. For example, the memory system may be processed with 16 bits or 32 bits. In case of an ARM (Advanced RISC Machine) processor, an ARM mode processes with 16 bits and a Thumb mode processes with 32 bits. In case of such a memory system, bit number of an instruction is selectively controlled. The memory system may be configured to transmit an EDC value of an instruction to be fetched to an unused bus while fetching the instruction.

Figure 7:
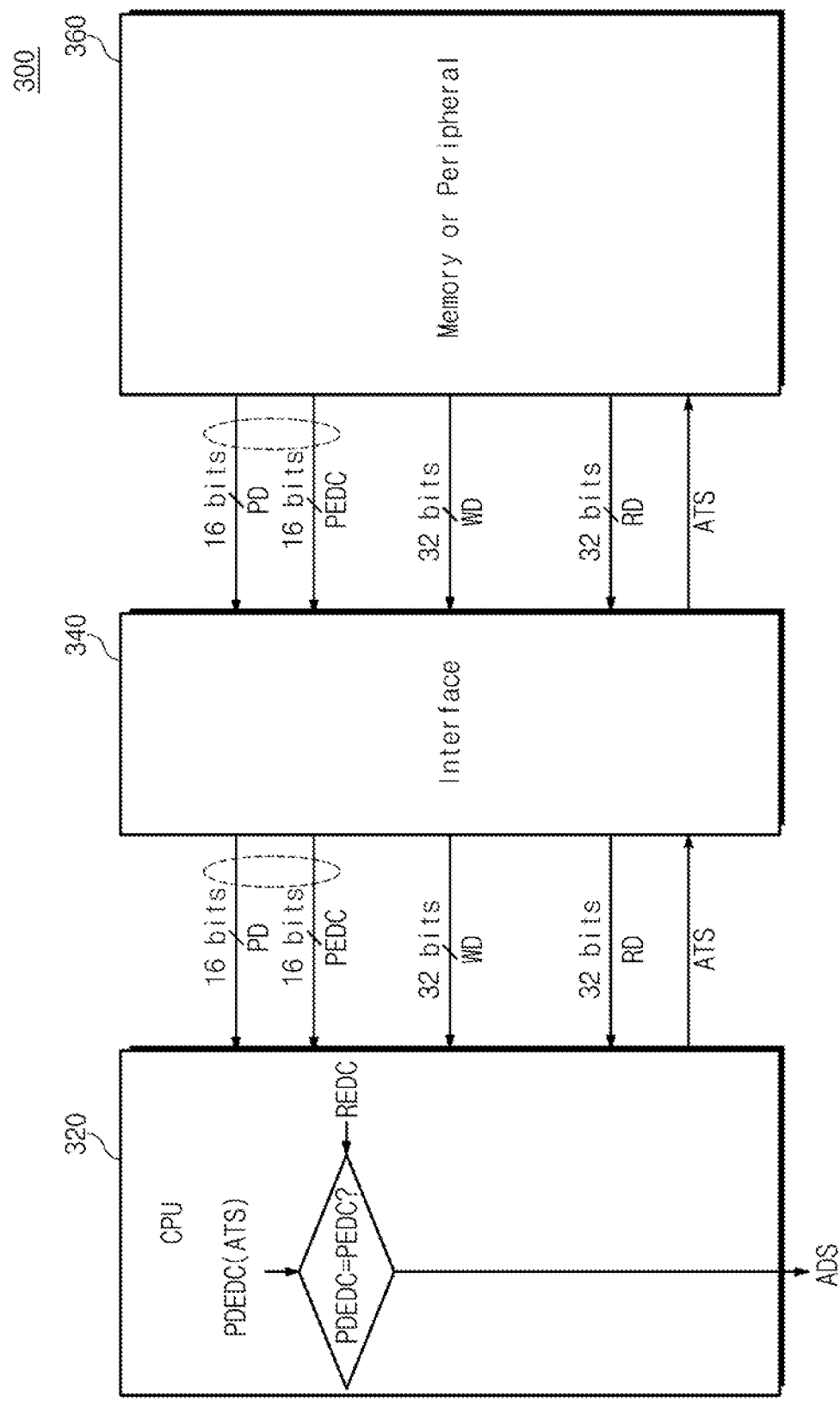
FIG. 7 illustrates an alternative memory system according to the present invention.

FIG. 7 illustrates an alternative memory system according to an embodiment of the present invention. Referring to FIG. 7, a memory system 300 may be selectively processed with 16 bits or 32 bits. That is, a processing mode of the memory system 300 includes a 32-bit mode and a 16-bit mode. In the 16-bit mode, an EDC value relative to an instruction is transmitted through an unused 16-bit bus while fetching a 16-bit instruction.

A method of preventing data hacking during an instruction fetch operation will now be described in detail. During the instruction fetch operation, an instruction PD is transmitted from a memory/peripheral circuit 360 through a 16-bit bus while an EDC value of the instruction PD (hereinafter referred to as "PEDC") is transmitted through an unused 16-bit bus. The value PEDC is an EDC value of the instruction PD calculated from the memory/peripheral circuit 360. Thus, the instruction fetch operation is performed.

A central processing unit (CPU) 320 calculates an EDC value of the instruction PD fetched from the memory/peripheral circuit 360 in response to a processing mode type signal ATS. The signal ATS specifies whether the memory system 300 is in a 32-bit processing mode or a 16-bit processing mode. The CPU 320 determines whether the calculated EDC value PDEDC is equal to the transmitted EDC value PEDC to generate an attack detection signal ADS.

If the calculated EDC value PDEDC is equal to the transmitted EDC value PEDC, it is determined that there is no hacking attack on an instruction. On the other hand, if the calculated EDC value PDEDC is not equal to the transmitted EDC value PEDC, it is determined that there is a hacking attack on an instruction. When it is determined that there is a hacking attack, the memory system 300 is reset or enters a specific mode such that the hacking does not proceed.

Figure 8:
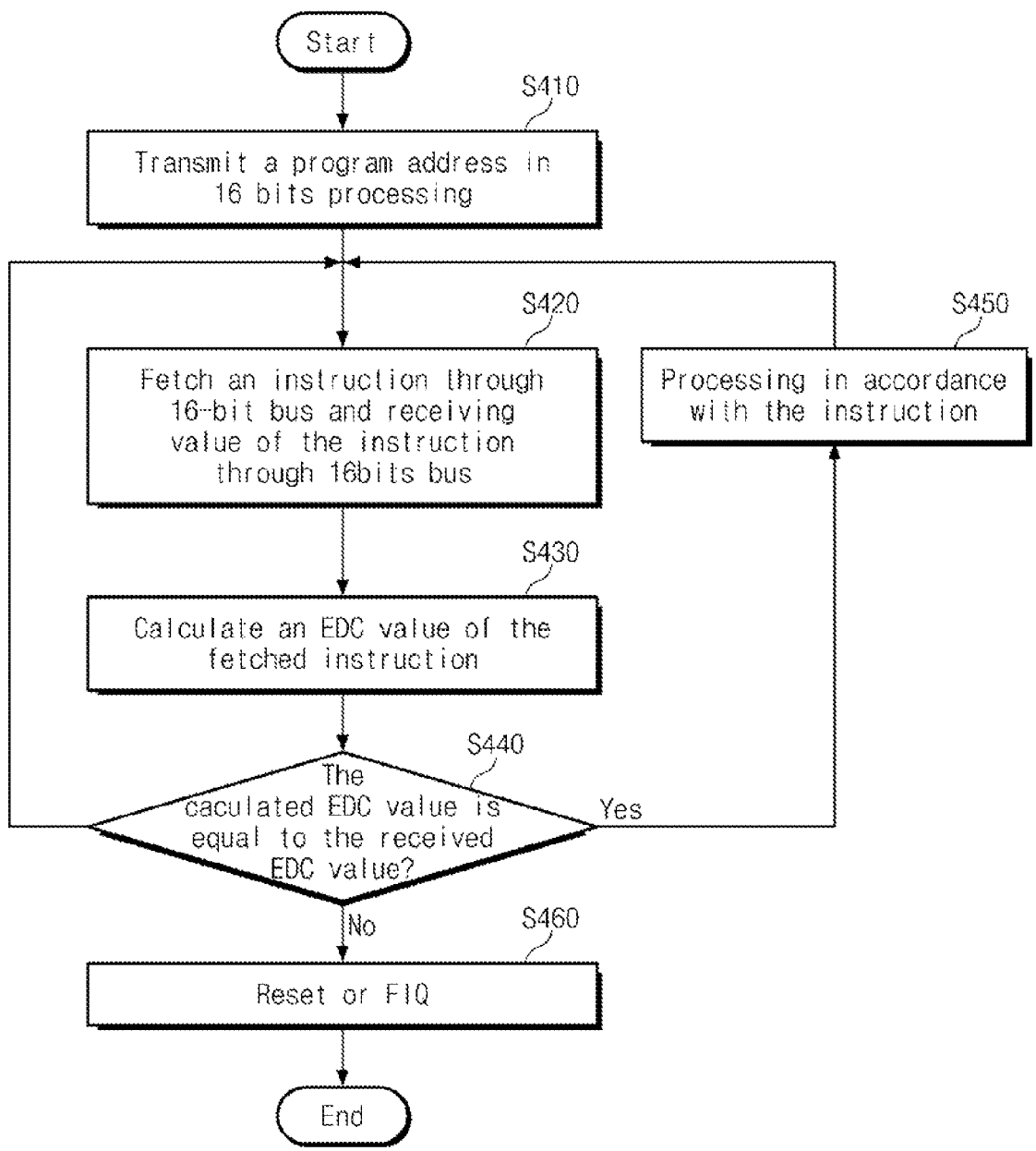
FIG. 8 is a flowchart illustrating the steps of processing an instruction of the memory system illustrated in FIG. 7.

FIG. 8 is a flowchart illustrating the steps of processing an instruction of the memory system 300 illustrated in FIG. 7. An instruction processing procedure will now be described below in detail with reference to FIGS. 7 and 8.

When the memory system 300 in a 16-bit processing mode is powered up, the CPU 320 transmits a program address via an interface 340 to the memory/peripheral circuit 360 to fetch an instruction (S410). The memory/peripheral circuit 360 reads an instruction corresponding to the program address and transmits the read instruction to the CPU 320 through a 16-bit bus. The memory/peripheral circuit 360 transmits an EDC value of the read instruction to the other 16-bit buses. Thus, a fetch operation for one instruction is completed (S420).

The CPU 320 calculates an EDC value of the transmitted instruction (S430). The CPU 320 determines whether a calculated EDC value is equal to a transmitted EDC value (S440). If the calculated EDC value is equal to the transmitted EDC value, it is determined that there is no hacking attack on an instruction and the instruction is processed (S450). Thereafter, the flow proceeds to S420 to fetch the next instruction. On the other hand, if the calculated EDC value is not equal to the transmitted EDC value, it is determined that there is a hacking attack on an instruction. Thus, the memory system is reset or enters a specific mode (S460).

The memory systems illustrated in FIGS. 5 to 8 use an unused bus as a transmission path of an error decoder code (EDC). As a result, the memory system according to an embodiment of the present invention has a more improved security measure against hacking attempts.

Other embodiments of the present invention provide an EDC instruction protection method. When data change or a power-up glitch arises from a laser attack or a glitch attack, the attack is detected by means of the EDC instruction protection method. Thus, a memory system according to other embodiments of the present invention is implemented to insert an EDC value with respect to all instructions.

Figures 9, 10:
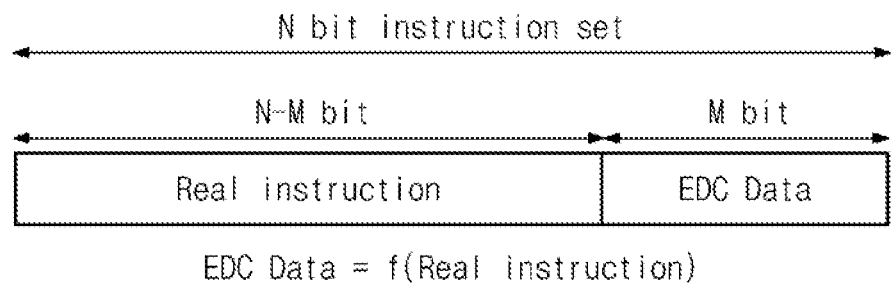
FIG. 9 illustrates an instruction of the memory system according to the present invention.
FIG. 10 illustrates an instruction set according to the present invention.

FIG. 9 illustrates an instruction of the memory system according to an embodiment of the present invention. Referring to FIG. 9, a size of an instruction set is N bit. The instruction set includes an M-bit EDC value (M being 1 or greater). Therefore, a size of an instruction is N minus M (N−M) bit.

A central processing unit (CPU) has an instruction set of N-bit size according to a used bit size of the instruction, as illustrated in FIG. 10. Since the real instructions are mapped to the N−M bit, the number of the instructions must decrease. When security of a memory system is important, the number of instructions of low frequency use may be decreased.

Figure 11:
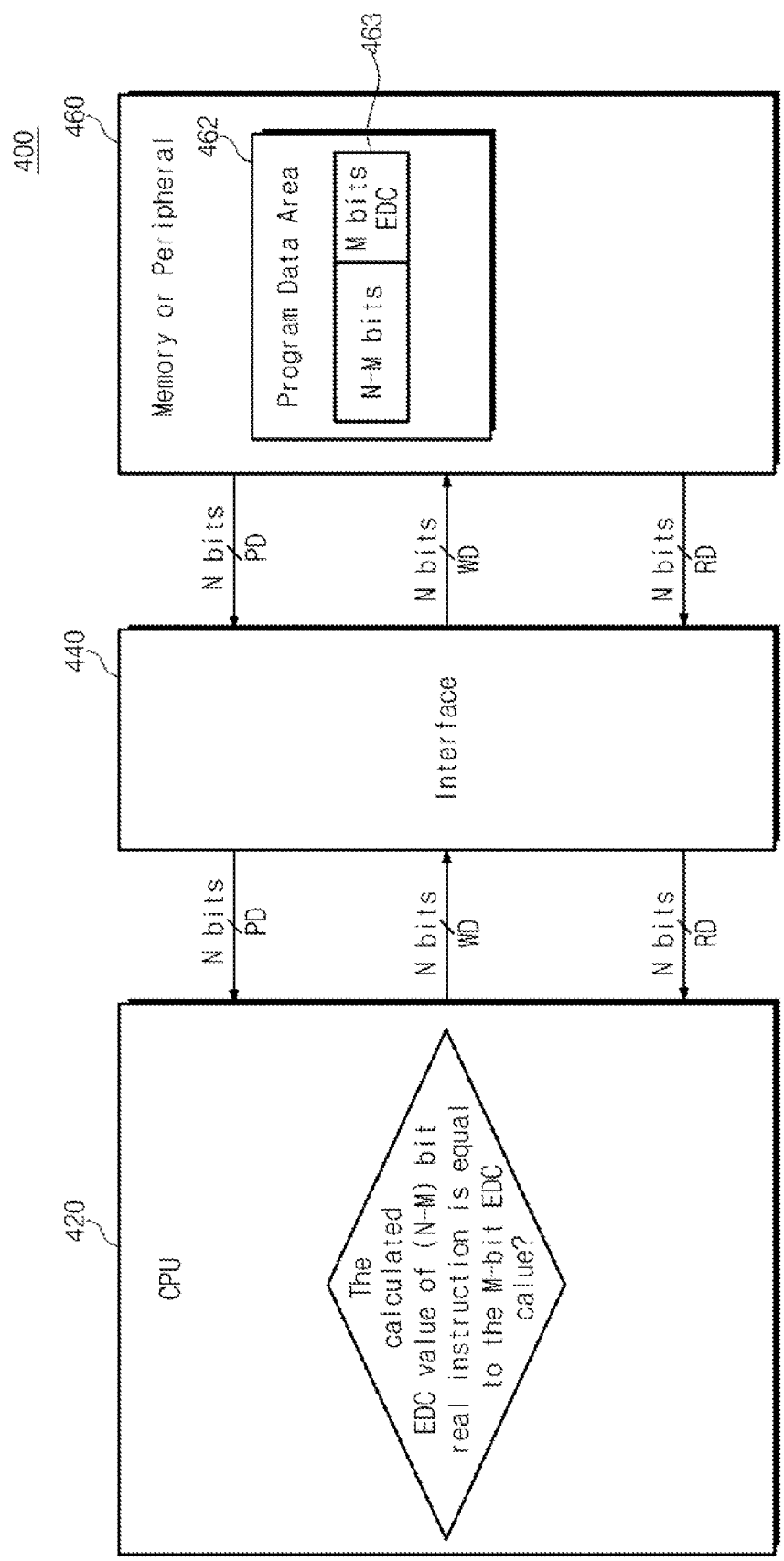
FIG. 11 illustrates a memory system according to yet other embodiments of the present invention.

FIG. 11 illustrates a memory system according to yet other embodiments of the present invention. Referring to FIG. 11, a memory system 400 includes a central processing unit 420, an interface 440, and a memory/peripheral circuit 460. The memory system 400 is processed with N bit architecture. An instruction set stored in a program data area 462 of the memory/peripheral circuit 360 is comprised of an (N−M) bit real instruction and an M-bit EDC value. The CPU 420 calculates an EDC value of an (N−M) bit real instruction during an instruction fetch operation to determine whether the calculated EDC value is equal to an M-bit EDC value of an transmitted instruction. As a result of the determination, the memory system 400 detects whether there is an attack attempt on an instruction.

The CPU 420 is configured to process an instruction having an EDC value. The CPU 420 is configured in hardware to decode a fetched instruction, calculate an EDC value of a transmitted real instruction, and compare the calculated EDC value with the transmitted EDC value.

Figure 12:
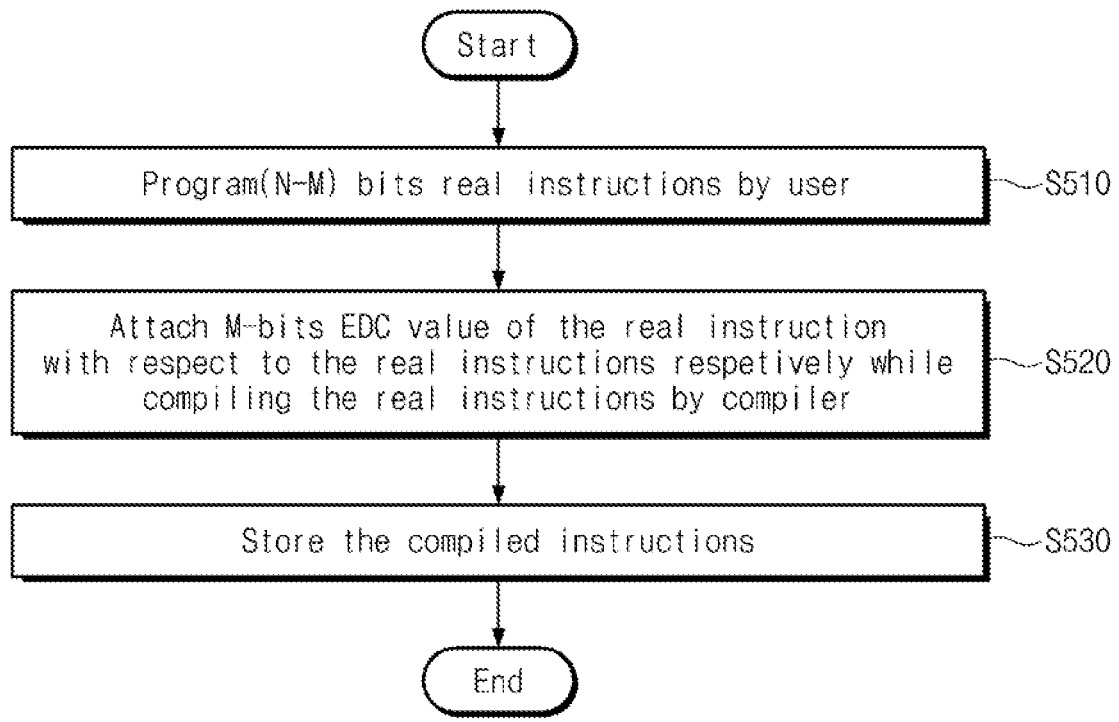
FIG. 12 illustrates steps of storing an instruction set of the memory system illustrated in FIG. 11.

FIG. 12 illustrates steps of storing an instruction set of the memory system 400 illustrated in FIG. 11. Referring to FIG. 12, a user programs an (N−M) bit real instruction (S510). A compiler attaches an M-bit EDC value corresponding to the (N−M) bit real instruction to a real instruction to generate an N-bit instruction during a compile operation (S520). Thus, an instruction set is generated. The instruction set 463 is stored in a program data area 462 of the memory/peripheral circuit 460 (S530). As a result, storage of the instruction set is completed.

Figure 13:
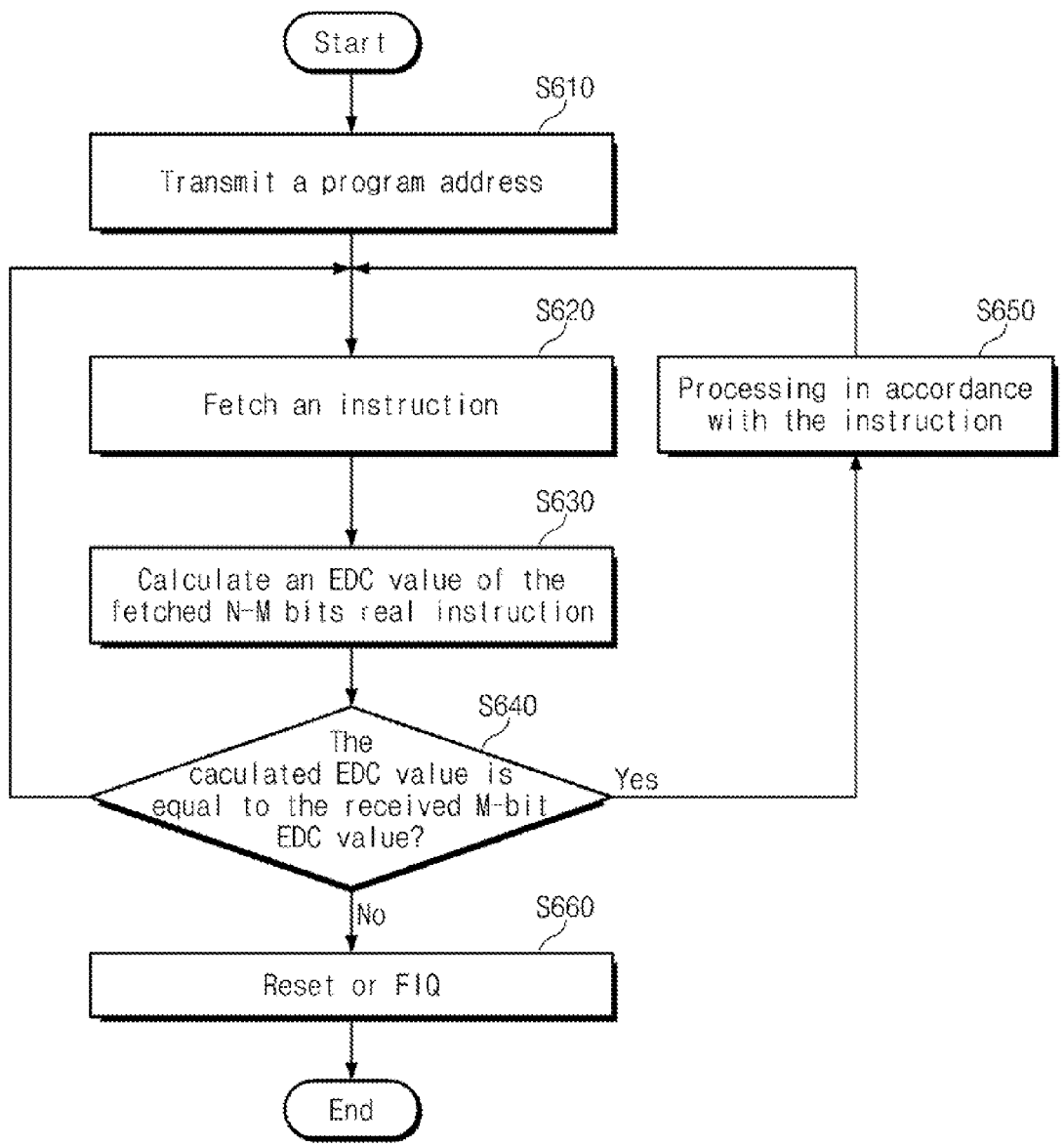
FIG. 13 is a flowchart illustrating the steps of processing an instruction of the memory system according to the present invention.

FIG. 13 is a flowchart illustrating the steps of processing an instruction of the memory system according to an embodiment of the present invention. An instruction processing procedure will now be described below with reference to FIGS. 11 and 13.

When the memory system 400 is powered up, the CPU 420 transmits a program address to the memory/peripheral circuit 460 to fetch an instruction (S610). The memory/peripheral circuit 460 reads an instruction corresponding to the program address and transmits the instruction to the CPU 420 through an N-bit bus. The transmitted instruction is comprised of an N–M bit real instruction and an M-bit EDC value. Thus, fetching an instruction is completed (S620).

The CPU 420 calculates an EDC value of the N–M bit real instruction of the fetched instruction (S630). The CPU 420 determines whether the calculated EDC value is equal to the M-bit EDC value (S640). If the calculated EDC value is equal to the M-bit EDC value, it is determined that there is no attack attempt on an instruction and the instruction is processed (S650). Thereafter, the flow proceeds to fetch the next instruction (S620). If the calculated EDC value is not equal to the M-bit EDC value, it is determined that there is an attack attempt on the instruction. Accordingly, the memory system 400 is reset or enters a specific mode (S660).

The above-described memory system 400 need not use an additional memory for storing an error detector code (EDC). Therefore, the memory system 400 may protect an instruction fetch procedure from the memory/peripheral circuit 460 to the CPU 420 without an increase of a code memory size.

Figure 14:
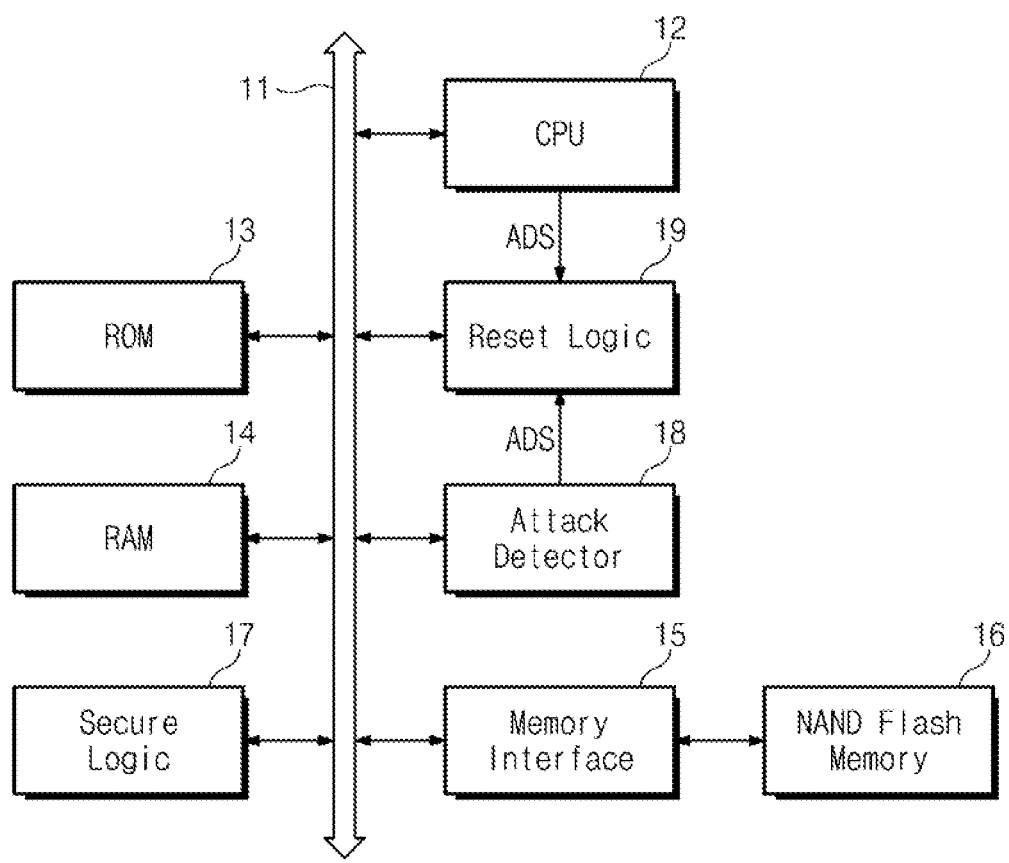
FIG. 14 is a block diagram of a smart card using a memory system according to the present invention.

FIG. 14 is a block diagram of a smart card using a memory system according to an embodiment of the present invention. Referring to FIG. 14, a smart card 10 includes a system bus 11, a central processing unit (CPU) 12, a read only memory (ROM) 13 storing an operating system, a random access memory (RAM) 14 temporarily storing data generated during data processing, a memory interface 15 performing an interface suitable to a NAND flash memory 16, a secure logic 17, an attack detector 18 detecting a hacking attack, and a reset logic 19 performing a reset operation when the hacking attack is detected.

The CPU 12 is organized with a structure as illustrated in FIGS. 1, 5, 7, and 11. Similarly, the memory interface 15 is organized a structure as illustrated in FIGS. 1, 5, 7, and 11, and the NAND flash memory 16 is organized with a structure as illustrated in FIGS. 1, 5, 7, and 11.

The reset logic 19 performs a reset operation in response to an attack detection signal generated from the CPUs or the memory/peripheral circuits illustrated in FIGS. 1, 5, 7, and 11. Alternatively, the reset logic 19 performs a reset operation in response to an attack detection signal detected by the attack detector 18.

The attack detector 18 may be one of various attack detectors such as a light detector, an inner insulation removal detector, and an active shield removal detector. The attack detector 18 may be configured to detect light irradiated to the NAND flash memory 16.

The above-described memory system includes an interface between a CPU and a memory/peripheral circuit. However, embodiments of the present invention are not limited thereto. That is, a memory system according to some embodiments of the present invention may be designed such that an interface is not needed between a CPU and a memory/peripheral circuit.

The memory system according to embodiments of the present invention may be applied to security-required cards such as multi-media cards (MMC) or security digital memory cards (SD).

Although the present invention has been described in connection with embodiments illustrated in the accompanying drawings, the present invention is not limited thereto. It will be apparent to those skilled in the art that various substitutions, modifications and changes may be made without departing from the scope and spirit of the invention.

What is claimed is:

1. A memory system comprising:
a storage device storing a plurality of instructions; and
a central processing unit processing an instruction fetched from the storage device, wherein the central processing unit detects a change in the instruction fetched from the storage device while processing the instruction,
wherein the central processing unit processes a security instruction set to detect whether the instruction fetched from the storage device is changed, the security instruction set including:
the instruction fetched from the storage device; and
an error detector code value of the instruction, wherein the central processing unit performs a compare operation to compare the instruction fetched from the storage device with the error detector code value,
wherein the storage device stores the security instruction set, wherein the security instruction set is automatically generated during a code compile operation of an instruction program including the plurality of instructions, and
wherein the security instruction set includes a compare instruction and the central processing unit performs the compare operation by executing the compare instruction.

2. The memory system as set forth in claim 1, wherein the central processing unit stores the instruction fetched from the storage device and performs an operation according to the instruction fetched from the storage device when the instruction fetched from the storage device is a compare instruction.

3. The memory system as set forth in claim 1, wherein each of the instructions includes:
an (N–M) bit real instruction having instruction information; and
an M-bit error detector code value corresponding to the (N–M) bit real instruction, wherein the central processing unit calculates an error detector code value of the (N–M) bit real instruction of the fetched instruction during an instruction fetch operation and compares the calculated error detector code value with the M-bit error detector code value of the fetched instruction to determine whether the (N–M) bit real instruction is attacked.

4. The memory system as set forth in claim 1, wherein the central processing unit performs a reset operation upon detecting the change in the instruction fetched from the storage device.

* * * * *